United States Patent [19]

Green

[11] Patent Number: 5,222,785

[45] Date of Patent: Jun. 29, 1993

[54] FULL WHEEL COVER MOUNTING AND CENTERING SYSTEM

[76] Inventor: James C. Green, 5119 Waldrup, Memphis, Tenn. 38116

[21] Appl. No.: 649,990

[22] Filed: Feb. 4, 1991

Related U.S. Application Data

[63] Continuation-in-part of Ser. No. 316,864, Feb. 28, 1989, abandoned, and a continuation-in-part of Ser. No. 161,737, Feb. 29, 1988, abandoned.

[51] Int. Cl.⁵ .................................................. B60B 7/14
[52] U.S. Cl. ............................... 301/37.37; 301/37.35; 301/108.4
[58] Field of Search ............... 301/37.1, 37.37, 37.29, 301/37.21, 108.1, 108.4, 5.21, 37.36, 37.35

[56] References Cited

U.S. PATENT DOCUMENTS

| | | | |
|---|---|---|---|
| 2,016,395 | 10/1935 | Sinclair | 301/37 S |
| 2,020,885 | 11/1935 | Gatta | 301/108 RX |
| 2,167,102 | 7/1939 | Burger | 301/37 SX |
| 2,725,257 | 11/1955 | Maurer et al. | 301/5 B |
| 3,876,257 | 4/1975 | Buerger | 301/37 P |
| 3,995,461 | 12/1976 | Hudson | 301/37 TX |
| 4,146,273 | 3/1979 | Spisak | 301/37 PX |
| 4,225,191 | 9/1980 | Knoski | 301/5 RX |
| 4,229,047 | 10/1980 | Beisch | 301/37 P |
| 4,523,789 | 6/1985 | Schwarz | 301/37 P |
| 4,632,465 | 12/1986 | Cummings | 301/108 S |
| 4,707,035 | 11/1987 | Kondo et al. | 301/37 P |
| 4,735,460 | 4/1988 | Tomida et al. | 301/37 P |
| 4,842,339 | 6/1989 | Roulinson | 301/37 PX |
| 4,884,851 | 12/1989 | Hempelmann et al. | 301/37 PX |
| 4,895,414 | 1/1990 | Fleming et al. | 301/37 PB |
| 4,991,909 | 12/1991 | Hamada | 301/37 P |
| 4,998,780 | 3/1991 | Eshler et al. | 301/37 S |

FOREIGN PATENT DOCUMENTS

| | | | |
|---|---|---|---|
| 3704384 | 8/1988 | Fed. Rep. of Germany | 301/37 TP |
| 622482 | 5/1927 | France | 301/108 S |
| 633632 | 2/1928 | France | 301/108 S |

Primary Examiner—Russell D. Stormer
Attorney, Agent, or Firm—Walker, McKenzie & Walker

[57] ABSTRACT

A full wheel cover mounting and centering system including a full wheel cover for completely covering the central body portion of a standard wheel and for abutting the rim portion of the standard wheel; and a plurality of attachment members for fixedly attaching the full wheel cover to the standard wheel and for insuring that the full wheel cover is precisely centered relative to the central body portion of the standard wheel and that the balance of the standard wheel is not adversely affected by the full wheel cover without requiring the standard wheel to be modified in any manner. The full wheel cover includes rigid, non-yielding positioning structure adjacent the outer circumference thereof for abutting the rim portion of the standard wheel to insure that the full wheel cover is centered and aligned relative to the rim portion without requiring the standard wheel to be modified in any manner.

21 Claims, 3 Drawing Sheets

FULL WHEEL COVER MOUNTING AND CENTERING SYSTEM

CROSS-REFERENCE TO RELATED APPLICATION

This is a continuation-in-part of my pending application, Ser. No. 07/316,864, filed Feb. 28, 1989 and now abandoned, entitled "Full Wheel Cover Mounting and Centering System," as a continuation-in-part of my now abandoned application, Ser. No. 07/161,737, filed Feb. 29, 1988, and now abandoned entitled "Hubca Mounting System."

BACKGROUND OF THE INVENTION

1. Field of the Invention

The present invention relates, in general, to a system for mounting and centering full wheel covers on a wheel that is mounted on a rotatable axle of a vehicle.

2. Description of the Related Art

Full wheel covers are typically attached to automotive wheels and the like by friction-type push-on, pull-off fasteners. While such friction-type fasteners allow the full wheel cover to be relatively easily and quickly attached to a wheel with a hammer or merely the heel of a person's hand and removed from the wheel with a pry-bar or typical screwdriver, etc., the unintended separation of the full wheel covers from the wheels with such friction-type systems often happens when the wheel hits a bump or hole at moderate to high speeds, etc. Additionally, the balance of the wheel is often adversely affected with such friction-type systems if the full wheel cover is mounted to the wheel in a slightly off-center position, etc. Also, the ability of such friction-type systems to secure and center the wheel cover on the wheel is normally reduced after the wheel cover has been repeatedly pushed on and pulled off the wheel. Many attempts have been made to improve such friction-type systems as evidenced by the many patents issued on such systems. The present inventor is aware of the following patents which are relevant to the present invention since they all disclose various methods of attaching wheel covers to wheels but which all are friction-type systems and utilize springs or the like extending outward from the periphery of the wheel cover to bitingly engage the rim portion of the wheel: Maurer et al, U.S. Pat. No. 2,725,257, issued Nov. 29, 1955; Buerger, U.S. Pat. No. 3,876,257, issued Apr. 8, 1975; Spisak, U.S. Pat. No. 4,146,273, issued Mar. 27, 1979; Beisch, U.S. Pat. No. 4,229,047, issued Oct. 21, 1980; Osborn, U.S. Pat. No. 4,383,716, issued May 17, 1983; and Schwarz, U.S. Pat. No. 4,523,789, issued Jun. 18, 1985.

The present inventor is aware of the following patents which are also relevant to the present invention since they all disclose various methods of attaching hub caps, wheel covers, and the like to wheels:

Sinclair, U.S. Pat. No. 2,016,395, issued Oct. 8, 1935, discloses a coverplate for a vehicle wheel. The coverplate 19 includes a disk 20 having a central portion 21 designed to serve the purpose of a usual hub cap. A yieldable, rubber ring 24 is secured to the periphery of the disk 20 and is compressed against the front side of the rim 11 of the wheel by bolts 25 extending through the disk 20 into the hub 15 of the wheel.

Gatta, U.S. Pat. No. 2,020,885, issued Nov. 12, 1935, discloses a wheel cover for use with a spoke-type vehicle wheel having a rim portion joined to a hub portion by a plurality of spokes. The hub portion of the wheel includes a plurality of prongs 7. The wheel cover includes a hub cover 13 having an annular portion 15 that extends radially to rest by its periphery on the rim 14 of the wheel and cover the spokes. The hub cover 13 includes an intermediate annular portion 16 for being engaged by the prongs 7 of the hub portion of the wheel to secure the wheel cover to the wheel.

Selleck, U.S. Pat. No. 3,352,133, issued Nov. 14, 1967, discloses a safety hub cap and wheel locking device including a spider 12 for being secured to a wheel 25 by special extension nuts 26 and bolts 30. A hub cap 14 and hub cap cover 16 are secured to the spider 12 by a key operated lock to prevent unauthorized removal of the wheel 25.

Trevarrow, U.S. Pat. No. 3,356,421, issued Dec. 5, 1967, discloses a wheel cover 11 that is attached to the studs 3 of a hub 2 of a vehicle by nuts 26 with a coil spring 29 positioned between the wheel cover 11 and an enlarged head of each nut 26. The outer flange 14 of the wheel cover 11 rests on the outer edge of the wheel rim 6.

Spisak, U.S. Pat. No. 3,549,204, issued Dec. 22, 1970, discloses a vehicle wheel assembly including a wheel 12 and a hub cover member 26, both adapted to be secured to a vehicle by studs 50.

Richter, U.S. Pat. No. 3,554,536, issued Jan. 12, 1971, discloses an improved wheel assembly including a hub cap 22 that is supported on the hub of a vehicle by lug bolts 16 which also attach the wheel to the hub.

Hudson, U.S. Pat. No. 3,995,461, issued Dec. 7, 1976, discloses a wheel lock for preventing theft of automobile wheels. The Hudson wheel lock comprises a first cover plate 21 for blocking access to the wheel bolts 13 used to attach a wheel to a vehicle, the first cover plate 21 being attached to the bolts 13 by screws 23 passing through the first cover plate 21; a second cover plate 26 in contact with and covering the screws 23; and a removable plug lock 27 holding the second cover plate 26 in position.

Dixon, U.S. Pat. No. 4,161,869, issued Jul. 24, 1979, discloses a wheel cover lock 10 including a bolt means 18 for being secured to one of the lugs 40 used to secure a wheel 14 to an axle. A hole 46 is made in the wheel cover so that one end of a key operated tumbler member 30 can pass therethrough and be locked onto the bolt means 18 to prevent unauthorized removal of the wheel cover.

Warren, U.S. Pat. No. 4,606,582, issued Aug. 19, 1986, discloses a wheel cover that is supported only at its center portion and having a contour closely matching the underlying wheel.

Cummings, U.S. Pat. No. 4,632,465, issued Dec. 30, 1986, discloses a hub cap to cover the deeply recessed drive axle wheel of a heavy road vehicle that is secured in place by nuts applied to externally threaded ends of respective extenders which pass through accommodating holes in the hub cap. The extenders are secured in place by having their opposite ends internally threaded and screwed onto the free ends of the usual lug bolts that extend beyond the usual lug nuts adjacent to the bottom of the recess.

Axelos, French Patent 622,482, dated May, 1927, discloses a hub cap 10 for disk-type wheels 3. The hub cap 10 covers the end 12 of an axle 1 and nuts 5 used to secure a wheel 3 to the axle 1. A pair of the nuts 5 are provided with an outwardly extending screw 7 for extending through the hub cap 10. A cap nut 11 is screwed on the outer end of each screw 7 to secure the hub cap 10 to the screws 7.

Beaufils, French Patent 633,632, dated February, 1928, discloses a spoke type wheel including a central hub or drum, a rim, and a plurality of spokes extending between the hub and the rim to secure the rim to the hub. The hub is attached to an axle by cap nuts 6 or by a jam nut 17. A hub cap is provided to hide the hub, to prevent the nuts attaching the hub to the axle from becoming loose by pressing on their extremities, and to decorate the wheel. The hub cap is secured to the hub by a screw 7 that is threaded into the outer end of one of the cap nuts 6, or by cap nuts 16 that are attached on top of one of the jam nuts 17 to the ends of the threaded studs extending from the axle.

None of the above patents disclose or suggest the present invention. More specifically, none of the above patents disclose or suggest a full wheel cover mounting and centering system including a full wheel cover for completely covering the central body portion of a standard wheel and for abutting the rim portion of the standard wheel, the full wheel cover having rigid, non-yielding positioning means adjacent the outer circumference thereof for abutting the rim portion of the standard wheel to insure that the full wheel cover is centered and aligned relative to the rim without requiring the standard wheel to be modified in any manner; and a plurality of attachment means for fixedly attaching the full wheel cover to the standard wheel and for insuring that the full wheel cover is precisely centered relative to the central body portion of the standard wheel and that the balance of the standard wheel is not adversely affected by the full wheel cover without requiring the standard wheel to be modified in any manner.

SUMMARY OF THE INVENTION

The present invention is directed toward providing an improved system for mounting and centering a full wheel cover on a wheel that is fixedly attached to an axle of a wheel vehicle. The concept of the present invention is to provide a system which will securely mount a full wheel cover to a wheel in a precisely centered and balanced position, and which will allow the full wheel cover to be repeatedly removed and reinstalled without reducing the ability of the system to securely mount the full wheel cover to the wheel in a precisely centered and balanced position.

The full wheel cover mounting and centering system of the present invention includes, in general, a full wheel cover for completely covering the central body portion of a standard wheel and for abutting the rim portion of the standard wheel, the full wheel cover having rigid, non-yielding positioning means adjacent the outer circumference thereof for abutting the rim portion of the standard wheel to insure that the full wheel cover is centered and aligned relative to the rim without requiring the standard wheel to be modified in any manner; and a plurality of attachment means for fixedly attaching the full wheel cover to the standard wheel and for insuring that the full wheel cover is precisely centered relative to the central body portion of the standard wheel and that the balance of the standard wheel is not adversely affected by the full wheel cover without requiring the standard wheel to be modified in any manner.

DESCRIPTION OF THE PREFERRED EMBODIMENTS

The full wheel cover mounting and centering system 11 of the present invention is for use with a wheeled vehicle such as a typical automobile having an axle 13, a wheel 15 for being fixedly attached to the axle 13. The wheel 15 has a center body portion 15' for being fixedly attached to the axle 13 and has a rim portion 15" attached to the circumferential edge of the central body portion 15' for receiving a standard tire or the like.

Figure 2:
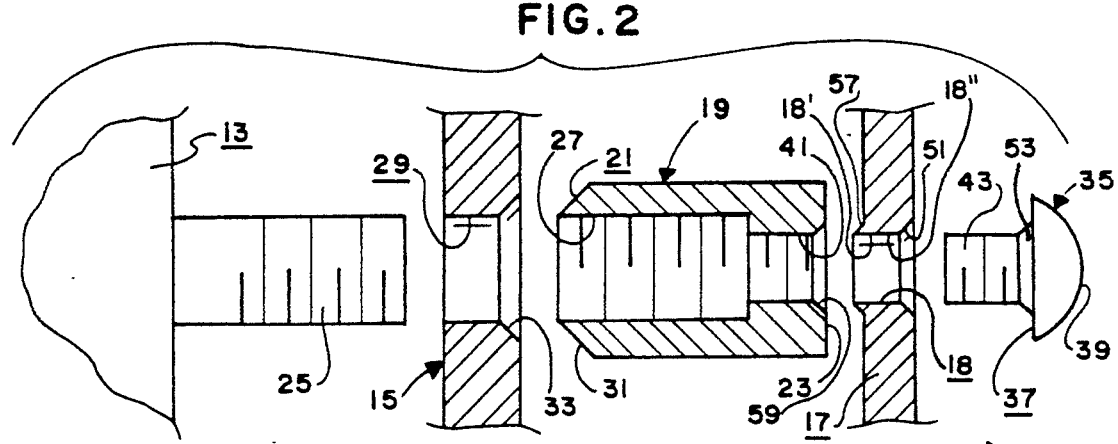
FIG. 2 is a enlarged sectional view of a portion of view 1.
Figure 3:
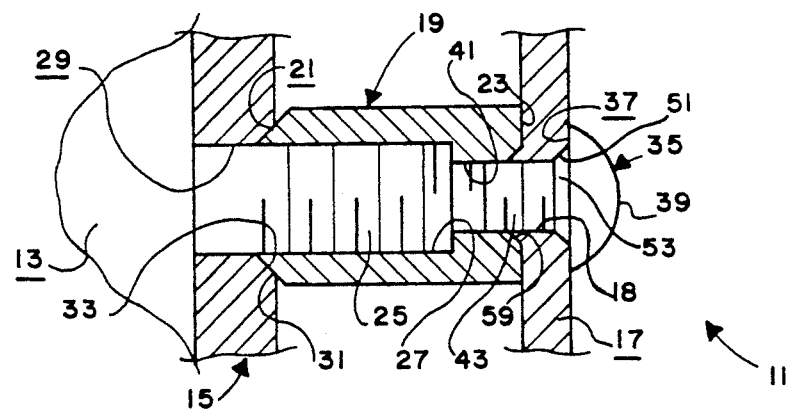
FIG. 3 is an assembled view of the parts of FIG. 2.

The system 11 includes a full wheel cover 17 for being mounted on the wheel 15. The full wheel cover 17 completely covers the central body portion 15' of the wheel 15 and abuts or substantially abuts the rim portion 15" of the wheel 15. The full wheel cover 17 has a plurality of apertures 18 therethrough. Each aperture has a inner end 18' and an outer end 18" (see FIGS. 2 and 4). The full wheel cover 17 is balanced and the apertures 18 are spaced evenly about the center of the full wheel cover 17 so as to not offset the balance of the full wheel cover 17.

The system 11 includes a plurality of attachment means for fixedly attaching the full wheel cover 17 to the wheel 15 and for insuring that the full wheel cover 17 is precisely centered relative to the central body portion 15' of the wheel 15 and that the balance of the wheel 15 is not adversely affected by the full wheel cover 17. Each of the attachment means has an extension portion for extending into one of the apertures 18 in the full wheel cover 17.

Each of the attachment means preferably includes a first attachment means 19 for fixedly attaching the wheel 15 to the axle 13. The first attachment means 19 has a first end 21 for being fixedly attached to the axle 13 and positioned against the exterior side of the wheel 15 and has a second end 23 for being positioned against the interior side of the full wheel cover 17. The first attachment means 19 is preferably adapted to be screwably attached to the axle 13 in any manner now apparent to those skilled in the art. Thus, the axle 13 preferably includes a threaded member and the first attachment means 19 preferably includes a coacting threaded member for being screwed onto the threaded member of the axle 13 with the wheel 15 sandwiched therebetween in a typical manner now apparent to those skilled in the art. In the embodiments shown in FIGS. 1-4 and 6 of the drawings, the threaded member of the axle 13 consists of an externally threaded male member 25 and the threaded member of the first attachment means 19 consists of an internally threaded female member 27 as will now be apparent to those skilled in the art. In the embodiment shown in FIG. 5 of the drawings, the threaded member of the axle 13 consists of an internally threaded female member 25' and the threaded member of the first attachment means 19 consists of an externally threaded male member 27'. It will be appreciated by those skilled in the art that various automobiles and the like are manufactured with axles 13 having externally threaded male members for allowing wheels 15 to be secured thereto while other automobiles and the like are manufactured with axles 13 having internally threaded female members for allowing wheels 15 to be secured thereto. Thus, the specific embodiment of first attachment means 19 to be used will depend on the specific construction of the automobile or the like that the system 11 is to be used with, as will now be apparent to those skilled in the art. It will be noted that with either embodiment, the wheel 15 is provided with an aperture 29 for allowing the externally threaded male member 25 or 27' to extend therethrough. In all embodiments, the first attachment means 19 is preferably provided with a bevelled male portion 31 for coacting with a bevelled countersink portion 33 of the aperture 29 to help center the aperture 29 about the threaded member 25 or 25' of the axle 13 and thus help center the wheel 15 on the axle 13 as will now be apparent to those skilled in the art.

Each of the attachment means preferably includes a second attachment means 35 for fixedly attaching the full wheel cover 17 relative to the first attachment means 19. The second attachment mean 35 has a first end 37 for being positioned against the exterior side of the full wheel cover 17 and being fixedly attached to the second end 23 of the first attachment means 19 and has a second or exterior end 39. In the embodiments shown in FIGS. 1-3 and 5 of the drawings, the first attachment means 19 has a threaded aperture 41 in the second end 23 thereof and the second attachment means 35 has a threaded male member 43 extending from the first end 37 thereof through one of the apertures 18 provided through the full wheel cover 17 for being screwably attached to the threaded aperture 41 to allow the full wheel cover 17 to be sandwiched therebetween to thereby attach the full wheel cover 17 to the first attachment means 19 and, in turn, to the wheel 15 and axle 13 as will now be apparent to those skilled in the art.

Figure 4:
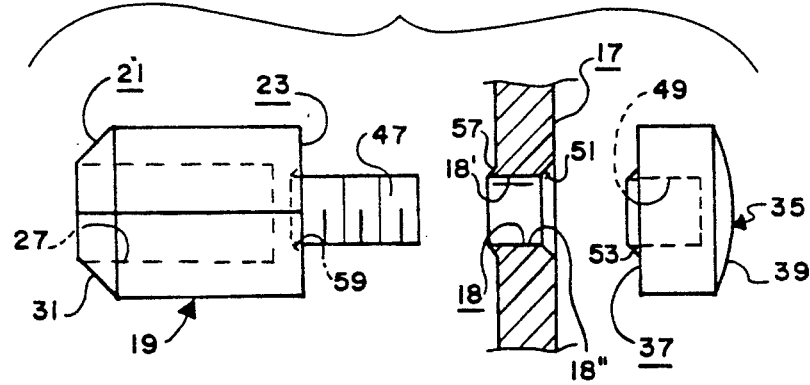
FIG. 4 is an exploded sectional view similar to a portion of FIG. 2 but showing a second embodiment of the present invention.
Figure 5:
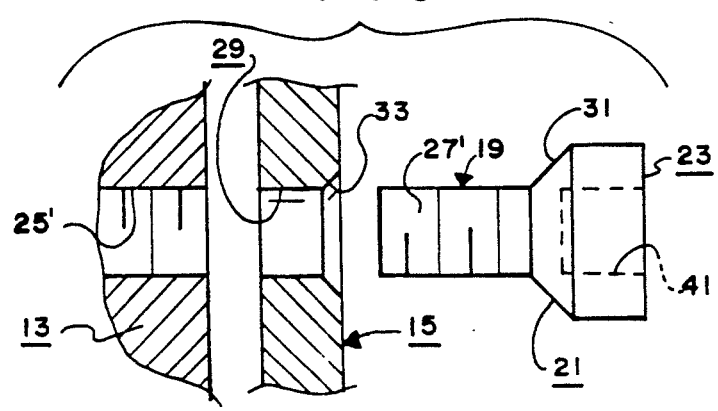
FIG. 5 is an exploded sectional view similar to a portion of FIG. 2 but showing a third embodiment of the present invention.

In the embodiment shown in FIG. 4 of the drawings, the first attachment means 19 has a threaded male member 47 extending from the second end 23 thereof and the second attachment means 35 has a threaded aperture 49 in the first end 37 thereof to allow the threaded male member 47 to extend through one of the apertures 18 through the full wheel cover 17 to the threaded aperture 49 of the second attachment means 35 and allow the full wheel cover 17 to be sandwiched between the first and second attachment means 19, 35 to thereby attach the full wheel cover 17 to the first attachment means 19 and, in turn, to the wheel 15 and axle 13 as will now be apparent to those skilled in the art. At least the second end 39 of the second attachment means 35 is enlarged compared to the apertures 18 to prevent the second attachment means 35 from passing through the apertures 18 as will now be apparent to those skilled in the art.

Figure 6:
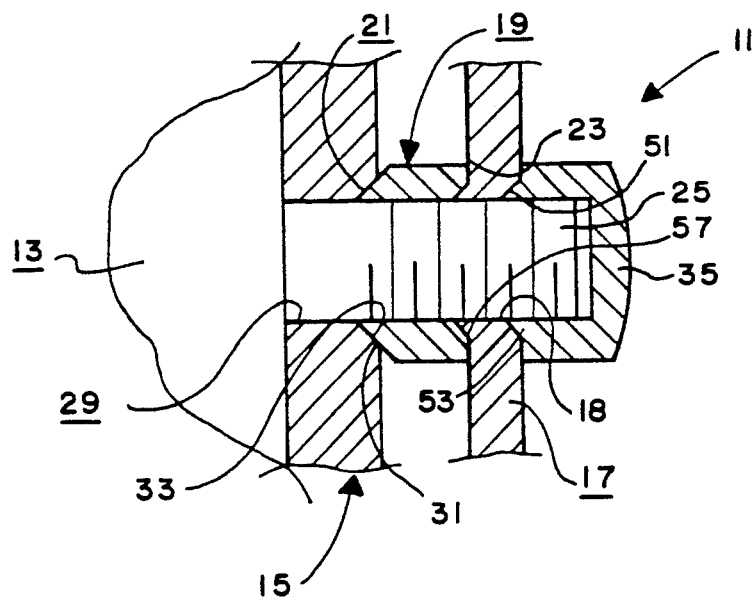
FIG. 6 is an assembled sectional view similar to FIG. 3 but showing a fourth embodiment of the present invention.

In the embodiment shown in FIG. 6 of the drawings, the first attachment means 19 may consist of a substantially typical nut that is sized so that the end of the threaded member 25 of the axle 13 extends past the first attachment means 19 when the first attachment means 19 is screwed onto the threaded member 25 with the wheel 15 sandwiched therebetween. In this embodiment, the apertures 18 through the full wheel cover 17 are large enough to allow the threaded member 25 to extend therethrough and the second attachment means 35 may consist of a substantially typical cap nut or the like for being screwed onto the end of the threaded member 25 to clamp the full wheel cover 17 to the first attachment means 19 and the wheel 15 as will now be apparent to those skilled in the art.

The system 11 includes centering means for centering the full wheel cover 17 relative to the axle 13. The centering means may be of various specific construction that will insure that the full wheel cove 17 is centered relative to the axle 13 and aligned with the wheel 15.

In the embodiments shown in FIGS. 2-4 and 6, the centering means includes a bevelled countersunk or female portion 51 in the outer end of each aperture 18 of the full wheel cover 17 and a coacting bevelled male portion 53 on the first end 37 of each second attachment means 35. Thus, in the specific embodiment shown in FIGS. 2 and 3, the bevelled male portion 53 is part of the bolt comprising the second attachment means 35 while in the specific embodiment shown in FIGS. 4 and 6, the bevelled male portion 53 is part of the nut comprising the second attachment means 35. This embodiment of the centering means may also include a bevelled male portion 57 adjacent the inner end of each aperture 18 of the full wheel cover 17 and a coacting bevelled countersunk or female portion 59 in each first attachment means 19 as will now be apparent to those skilled in the art. It should be noted that the full wheel cover 17 may be constructed out of relatively thin sheet metal and the apertures 18, bevelled female portions 51 and bevelled male portions 57 may merely be stamped into the full wheel cover 17 as will now be apparent to those skilled in the art.

Figure 7:
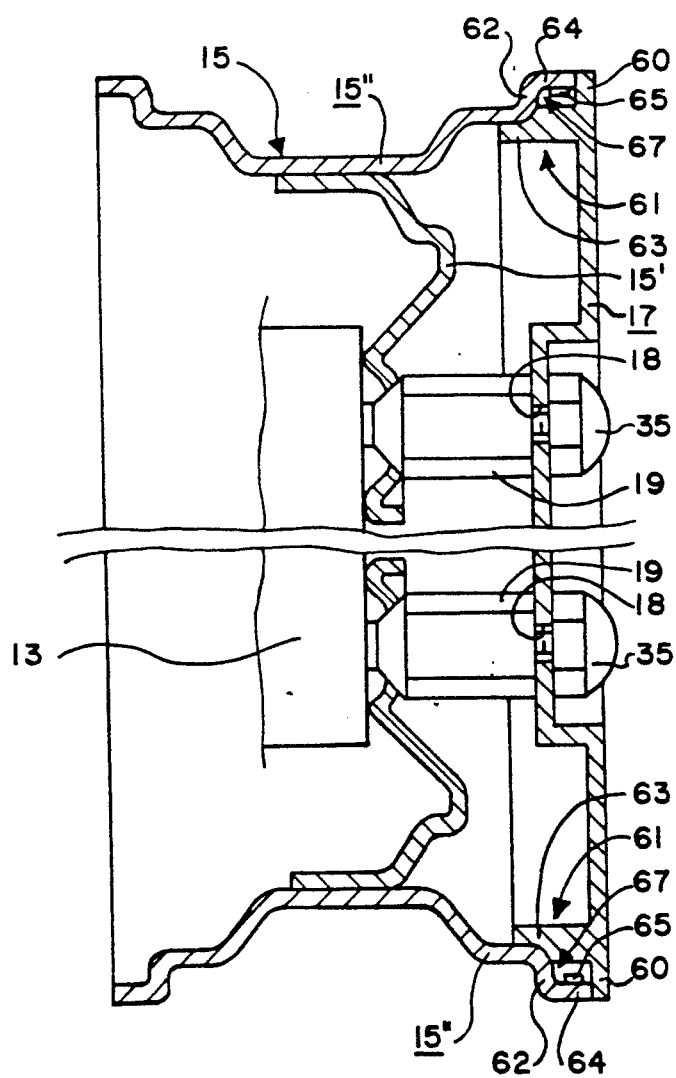
FIG. 7 is a sectional view of a full wheel cover and a wheel attached to an axle showing a fifth embodiment of the full wheel cover mounting and centering system of the present invention.

In the embodiment shown in FIG. 7, the full wheel cover 17 has an outer circumference 60 and the centering means includes rigid, non-yielding positioning means 61 on or adjacent the outer circumference 60 of the full wheel cover 17 for engaging a portion of the rim 15" of the wheel 15. More specifically, the rim 15" of the wheel 15 preferably has an outer shoulder 62 that the rigid, non-yielding positioning means 61 abuts as clearly shown in FIG. 7 to insure that the full wheel cover 17 is centered and aligned relative to the rim 15" as will now be apparent to those skilled in the art. The rigid, non-yielding positioning means 61 preferably includes a rigid, non-yielding lug portion 63 for abutting a portion of the outer shoulder 62 of the rim 15" of the wheel 15 to insure that the full wheel cover 17 is centered and aligned relative to the rim 15". Being rigid and non-yielding, the lug portion 63 allows the full wheel cover 17 to be repeatedly removed and reinstalled without reducing the ability of the system 11 to securely mount the full wheel cover 17 to the wheel 15 in a precisely centered and balanced position as would be the case if the lug portion 63 was a friction-type push-on, pull-off fastener. The rim 15" of the wheel 15 preferably has an outer portion 64 and the wheel preferably includes one or more balancing weights 65 secured to the outer portion 64 of the rim 15" (see, in general, FIG. 7) for balancing the wheel 15 as will now be apparent to those skilled in the art. The balancing weights 65 may be clamped to the outer edge of the rim 15" by a typical clamp member (not shown) as will now be apparent to those skilled in the art. The rigid, non-yielding lug portion 63 may be continuous about the entire periphery of the full wheel cover 17 or may consist of a plurality of separate finger portions for engaging the rim 15" as will now be apparent to those skilled in the art. The rigid, non-yielding lug portion 63 preferably has a notch or cavity 67 for accommodating the balancing weights 65 and the clamp members. The cavity 67 preferably extends completely around the rigid, non-yielding lug portion 63 but may be provided only at locations were the balancing weights 65 are located. In this embodiment, the apertures 18 through the full wheel cover 17 are preferably slightly larger than the male threaded members extending therethrough to allow a limited amount of movement therebetween as the rigid, non-yielding positioning means 61 centers the full wheel cover 17 as will now be apparent to those skilled in the art.

Figure 1:
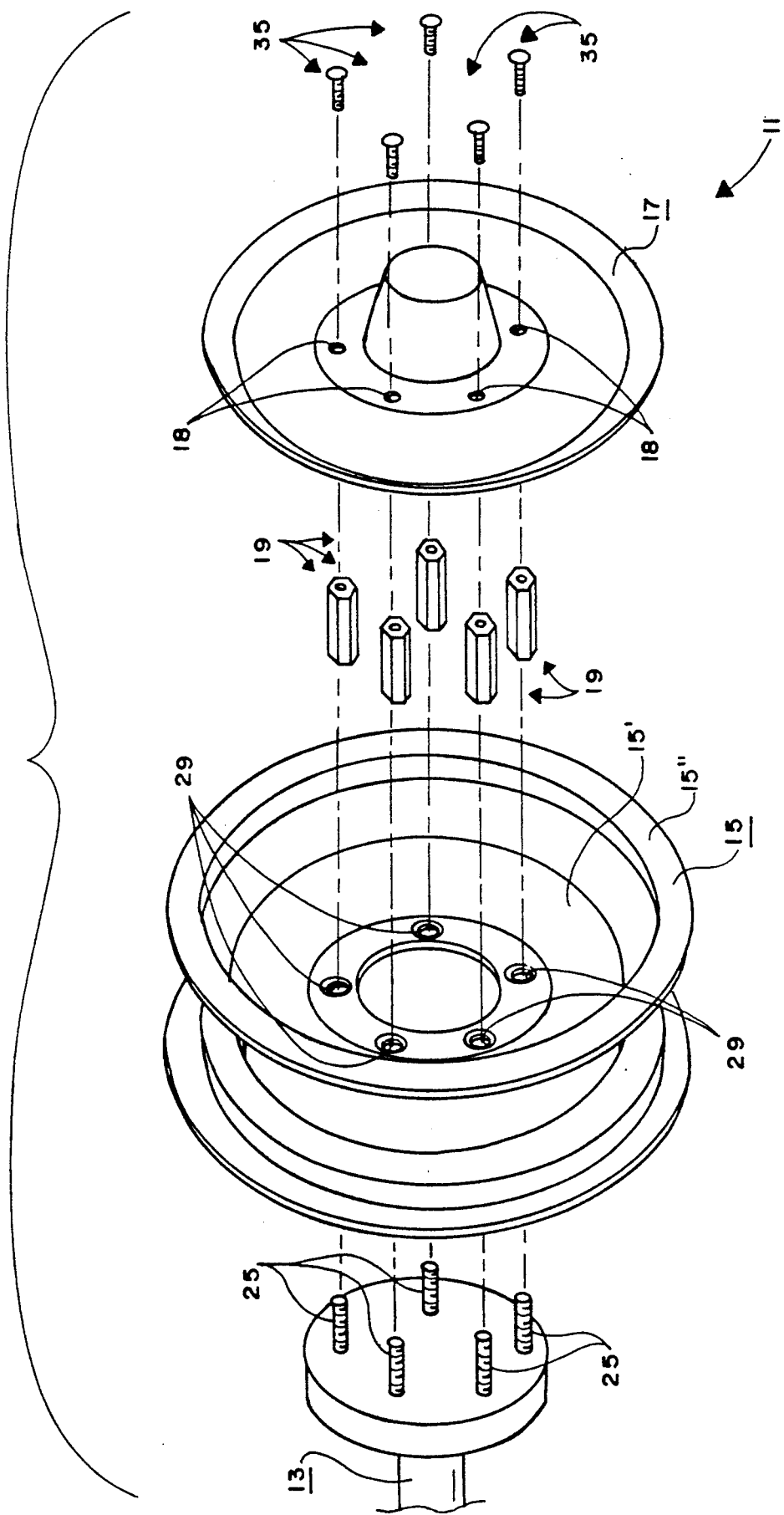
FIG. 1 is an exploded pictorial view of the full wheel cover mounting and centering system of the present invention shown associated with an axle and a wheel.

As will be appreciated by those skilled in the art and as clearly disclosed in FIG. 1 of the drawings, the system 11 contemplates an evenly spaced plurality of the first and second attachment means 19, 35 and an evenly spaced plurality of apertures 18 through the full wheel cover 17. Thus, the typical axle 13 is provided with a plurality of the threaded members 25 or 25' for allowing the wheel 15 to be securely mounted and properly positioned thereon and the system 11 preferably includes first and second attachment means 19, 35 for each threaded member 25 or 25'. The threaded members 25 or 25' and the first and second attachment means 19, 35 are spaced evenly about the longitudinal axis of the axle 13 so as to not offset the balance of the wheel.

The specific construction of the system 11 may vary as will now be apparent to those skilled in the art. The full wheel cover 17 may be stamped or formed out of sheet metal or the like in any manner now apparent to those skilled in the art. The apertures 18 through the full wheel cover 17 may be drilled or otherwise formed therein in any manner now apparent to those skilled in the art. The first and second attachment means 19, 35 are preferably machined or otherwise manufactured from an appropriate metal as will now be apparent to those skilled in the art.

As thus constructed and used, the present invention provides an improved system for mounting full wheel covers to wheels which will prevent the unintended separation of the full wheel covers from the wheels such as now frequently happens when the wheel hits a bump or hole at moderate to high speeds, etc., which will insure that the balance of the wheel is not adversely affected by mounting the full wheel cover thereto in an off-center position, etc., and which allows the full wheel cover to be repeatedly removed and reinstalled without reducing the ability of the system to securely mount the full wheel cover to the wheel in a precisely centered and balanced position.

Although the present invention has been described and illustrated with respect to preferred embodiments and preferred uses therefor, it is not to be so limited since modifications and changes can be made therein which are within the full intended scope of the invention.

I claim:

1. A full wheel cover mounting and centering system for use with a standard wheel of a wheeled vehicle of the type including an axle, said standard wheel having a central body portion for being fixedly attached to and centered about said axle and having a rim portion attached to the circumferential edge of said central body portion, said rim portion having an outer shoulder with an inwardly facing side directed toward the longitudinal axis of said axle; said system comprising:
   a) a full wheel cover for completely covering said central body portion of said standard wheel and abutting said rim portion of said standard wheel, said full wheel cover having a plurality of apertures therethrough, said full wheel cover being balanced, said apertures being spaced evenly about the center of said full wheel cover so as to not offset the balance of said full wheel cover, said full wheel cover having an outer circumference; said full wheel cover including rigid, non-yielding positioning means adjacent said outer circumference thereof for abutting said inwardly facing side of said outer shoulder of said rim portion of said standard wheel when said full wheel cover is mounted on said standard wheel to insure that said full wheel cover is centered and aligned relative to said rim portion without requiring said standard wheel to be modified in any manner; and
   b) a plurality of attachment means for fixedly attaching said full wheel cover to said standard wheel; wherein said system insures that said full wheel cover is precisely centered relative to said central body portion of said standard wheel and that the balance of said standard wheel is not adversely affected by said full wheel cover without requiring said standard wheel to be modified in any manner.

2. The system of claim 1 in which said attachment means includes:
   a) a plurality of first attachment means for fixedly attaching said standard wheel to said axle, each of said first attachment means having a first end fixedly attached to said axle with said wheel positioned therebetween and having a second end; and
   b) a plurality of second attachment means for fixedly attaching said full wheel cover to said first attachment means, each of said second attachment means having a first end fixedly attached relative to said second end of one of said first attachment means with said full wheel cover positioned therebetween and having a second end; said first and second attachment means being spaced evenly about the longitudinal axis of said axle so as to not offset the balance of said wheel.

3. The system of claim 2 in which each of said apertures through said full wheel cover has an outer end and an inner end, and in which said outer end of each aperture through said full wheel cover has a female bevelled portion; and in which each of said second attachment means includes a male bevelled portion for coacting with said female bevelled portion of one of said apertures through said full wheel cover for centering said aperture about said extension portion thereof.

4. The system of claim 2 in which said wheel has a plurality of apertures therethrough, in which said axle has an externally threaded male member for extending through each of said apertures in said wheel, and in which said first end of each of said first attachment means has a threaded aperture for screwably receiving one of said studs of said axle with said wheel held therebetween.

5. The system of claim 4 in which said first end of each of said second attachment means includes an externally threaded male member for extending through one of said apertures in said full wheel cover, and in which said second end of each of said first attachment means has a threaded aperture for screwably receiving said externally threaded male member of one of said second attachment means with said full wheel cover held therebetween.

6. The system of claim 5 in which said second end of each of said second attachment means includes an enlarged head that will not pass through any of said apertures in said full wheel cover.

7. The system of claim 4 in which said first end of each of said second attachment means has a threaded aperture therein, and in which said second end of each of said first attachment means has an externally threaded male member for extending through one of said apertures through said full wheel cover and for screwably extending into said threaded aperture of one of said second attachment means with said full wheel cover held therebetween.

8. The system of claim 2 in which said wheel has a plurality of apertures therethrough, in which said axle has a plurality of threaded apertures, and in which said first end of each of said first attachment means has an externally threaded male member for extending through one of said apertures through said wheel and for screwably extending into one of said threaded apertures in said axle with said wheel held therebetween.

9. The system of claim 1 in which said rigid, non-yielding positioning means includes a rigid, non-yielding lug portion for abutting said outer shoulder of said rim portion of said wheel to insure that said full wheel cover is centered and aligned relative to said rim portion; said rigid, non-yielding lug portion being continuous about the entire periphery of said full wheel cover with at least diametrically opposed portions of said lug portion abutting said inwardly facing side of said outer shoulder of said rim portion when said full wheel cover is mounted on said standard wheel.

10. The system of claim 9 in which said rim portion of said wheel has an outer portion, in which said wheel has balancing weights secured to said outer portion of said rim portion, and in which said rigid, non-yielding lug portion has a cavity for accommodating said balancing weights secured to said outer portion of said rim portion.

11. In combination with a standard wheel of a wheeled vehicle of the type including an axle and a wheel, a full wheel cover mounting and centering system covering said standard wheel, said standard wheel having a central body portion for being fixedly attached to said axle and having a rim portion attached to the circumferential edge of said central body portion, said rim portion of said standard wheel having an outer shoulder with an inwardly facing side directed toward the longitudinal axis of said axle, said system comprising:

a) a full wheel cover completely covering said central body portion of said standard wheel and abutting said rim portion of said standard wheel, said full wheel cover having a plurality of apertures therethrough, said full wheel cover being balanced, said apertures being spaced evenly about the center of said full wheel cover so as to not offset the balance of said full wheel cover, said full wheel cover having an outer circumference;

b) a plurality of attachment means fixedly attaching said full wheel cover to said standard wheel and for insuring that said full wheel cover is precisely centered relative to said central body portion of said standard wheel and that the balance of said standard wheel is not adversely affected by said full wheel cover without requiring said standard wheel to be modified in any manner; and c) centering means for centering said full wheel cover on said central body portion of said standard wheel; said centering means including rigid, non-yielding positioning means on said outer circumference of said full wheel cover engaging said inwardly facing side of said outer shoulder of said rim portion of said standard wheel when said full wheel cover is mounted on said standard wheel to insure that said full wheel cover is centered and aligned relative to said rim portion when said full wheel cover is mounted on said standard wheel with at least diametrically opposed portions of said rigid, non-yielding positioning means abutting said inwardly facing side of said outer shoulder of said rim portion when said full wheel cover is mounted on said standard wheel without requiring said standard wheel to be modified in any manner and for allowing said full wheel cover to be repeatedly removed and reinstalled without reducing the ability of said system to securely mount said full wheel cover to said standard wheel in a precisely centered and balanced position.

12. The system of claim 11 in which said attachment means includes:

a) a plurality of first attachment means for fixedly attaching said wheel to said axle, each of said first attachment means having a first end fixedly attached to said axle with said wheel positioned therebetween and having a second end; and b) a plurality of second attachment means for fixedly attaching said full wheel cover to said first attachment means, each of said second attachment means having a first end fixedly attached relative to said second end of one of said first attachment means with said full wheel cover positioned therebetween and having a second end; said first and second attachment means being spaced evenly about the longitudinal axis of said axle so as to not offset the balance of said wheel.

13. The system of claim 12 in which each of said apertures through said full wheel cover has an outer end and an inner end, and in which said outer end of each aperture through said full wheel cover includes a female bevelled portion, and in which each of said second attachment means includes a male bevelled portion for coacting with said female bevelled portion of one of said apertures through said full wheel cover for centering said aperture about said extension portion thereof.

14. The system of claim 12 in which said wheel has a plurality of apertures therethrough, in which said axle has an externally threaded male member for extending through each of said apertures in said wheel, and in which said first end of each of said first attachment means has a threaded aperture for screwably receiving one of said studs of said axle with said wheel held therebetween.

15. The system of claim 14 in which said first end of each of said second attachment means includes an externally threaded male member for extending through one of said apertures in said full wheel cover, and in which said second end of each of said first attachment means has a threaded aperture for screwably receiving said externally threaded male member of one of said second attachment means with said full wheel cover held therebetween.

16. The system of claim 15 in which said second end of each of said second attachment means includes an enlarged head that will not pass through any of said apertures in said full wheel cover.

17. The system of claim 14 in which said first end of each of said second attachment means has a threaded aperture therein, and in which said second end of each of said first attachment means has an externally threaded male member for extending through one of said apertures through said full wheel cover and for screwably extending into said threaded aperture of one of said second attachment means with said full wheel cover held therebetween.

18. The system of claim 12 in which said wheel has a plurality of apertures therethrough, in which said axle has a plurality of threaded apertures, and in which said first end of each of said first attachment means has an externally threaded male member for extending through one of said apertures through said wheel and for screwably extending into one of said threaded apertures in said axle with said wheel held therebetween.

19. The system of claim 11 in which said rigid, non-yielding positioning means includes a rigid, non-yielding lug portion for abutting said outer shoulder of said rim portion of said wheel to insure that said full wheel cover is centered and aligned relative to said rim portion.

20. The system of claim 19 in which said wheel has balancing weights secured to said outer portion of said rim portion, and in which said rigid, non-yielding lug portion has a cavity for accommodating said balancing weights secured to said outer portion of said rim portion.

21. The system of claim 1 in which said rigid, non-yielding positioning means includes a rigid, non-yielding lug portion for abutting said outer shoulder of said rim portion of said wheel to insure that said full wheel cover is centered and aligned relative to said rim portion; said rigid, non-yielding lug portion including a plurality of separate finger portions for engaging said rim portion of said wheel with at least diametrically opposed finger portions abutting said outer shoulder of said rim portion when said full wheel cover is mounted on said standard wheel.

* * * * *